US011003764B2

(12) United States Patent
Shukla et al.

(10) Patent No.: US 11,003,764 B2
(45) Date of Patent: May 11, 2021

(54) SYSTEM AND METHOD FOR EXPLOITING ATTACK DETECTION BY VALIDATING APPLICATION STACK AT RUNTIME

(71) Applicants: Jayant Shukla, Sierra Madre, CA (US); Abhay Kanhere, Fremont, CA (US); Kiran Thirumalai, Saratoga, CA (US)

(72) Inventors: Jayant Shukla, Sierra Madre, CA (US); Abhay Kanhere, Fremont, CA (US); Kiran Thirumalai, Saratoga, CA (US)

( * ) Notice: Subject to any disclaimer, the term of this patent is extended or adjusted under 35 U.S.C. 154(b) by 559 days.

(21) Appl. No.: 15/889,208

(22) Filed: Feb. 6, 2018

(65) Prior Publication Data
US 2019/0243964 A1 Aug. 8, 2019

(51) Int. Cl.
G06F 21/54 (2013.01)
H04L 29/06 (2006.01)

(52) U.S. Cl.
CPC ........ G06F 21/54 (2013.01); G06F 2221/033 (2013.01); H04L 63/02 (2013.01); H04L 63/0263 (2013.01); H04L 63/20 (2013.01)

(58) Field of Classification Search
CPC ............... G06F 21/54; G06F 2221/033; H04L 63/0263; H04L 63/20; H04L 63/02
See application file for complete search history.

(56) References Cited

U.S. PATENT DOCUMENTS

| 6,293,712 | B1* | 9/2001 | Coutant | G06F 9/4484 717/155 |
| 7,546,587 | B2* | 6/2009 | Marr | G06F 21/10 717/124 |
| 8,181,170 | B2* | 5/2012 | Patil | G06F 8/52 717/154 |
| 9,569,613 | B2* | 2/2017 | Yamada | G06F 8/30 |
| 9,977,897 | B2* | 5/2018 | Momot | G06F 9/30054 |
| 2008/0016339 | A1* | 1/2008 | Shukla | G06F 21/566 713/164 |
| 2011/0271148 | A1* | 11/2011 | Eigler | H01F 10/32 714/45 |
| 2014/0337637 | A1* | 11/2014 | Kiperberg | G06F 21/14 713/189 |
| 2016/0034687 | A1* | 2/2016 | Rhee | G06F 21/60 726/23 |

OTHER PUBLICATIONS

Monrose et al. RAID. 2016. LNCs 9854, pp. 71-97. (Year: 2016).*

* cited by examiner

Primary Examiner — Samson B Lemma
Assistant Examiner — Abdullah Almamun

(57) ABSTRACT

In one aspect, a computer-implemented method for monitoring and validating execution of an executable binary code, includes the step of, prior to beginning execution of the executable binary code, disassembling the executable binary code, listing all of application programming interfaces (API) or function calls in the executable binary code, generating a validation table for a type of each of the APIs or each of the function calls, a location of each of the APIs or each of the function calls, and a return address of each of the APIs or each of the function calls in the executable binary code, and listing in the validation table the type of each of the APIs or each of the function calls.

14 Claims, 11 Drawing Sheets

910

```
43e0:   e8 a3 ef ff ff       .. call 0x3388
43e5:   90                   .nop 1fb18:  f7 d8                neg    %eax
1fb1a:  64 89 02             mov    %eax,%fs:(%rdx)
1fb1d:  48 83 c8 ff          or     $0xffffffffffffffff,%rax
1fb21:  4c 8d 94 24 00 02 00 lea    0x200(%rsp),%r10
1fb28:  00
1fb29:  4c 63 c0             movslq %eax,%r8
1fb2c:  45 31 ed             xor    %r13d,%r13d
1fb2f:  41 bc 01 00 00 00    mov    $0x1,%r12d
1fb35:  48 83 cd ff          or     $0xffffffffffffffff,%rbp
1fb39:  ba 00 04 00 00       mov    $0x400,%edx
1fb3e:  4c 89 d6             mov    %r10,%rsi
1fb41:  4c 89 c7             mov    %r8,%rdi
1fb44:  44 89 e8             mov    %r13d,%eax
1fb47:  0f 05                syscall
```

920

Rule

| Address | 0x43e0 |
|---|---|
| Type | call |
| Target | write |
| Target address | 0x3388 |
| Return address | 0x43e5 |

930

Rule

| Address | 0x1fb47 |
|---|---|
| Instruction | sysenter |
| Target | write |
| Target address | N/A |
| Return address | 0x1fb49 |

SYSTEM AND METHOD FOR EXPLOITING ATTACK DETECTION BY VALIDATING APPLICATION STACK AT RUNTIME

BACKGROUND

The execution stack of an application or computer program or executable binary code is the region in memory of an executing application that stores information about the functions active in the program at that moment. As functions execute and call other functions, stack frames are pushed onto the stack so that the application can return to the calling function and continue its execution from there once the actions of the called function are complete. The stack frames are pushed onto the stack in a last-in-first-out (LIFO) manner so that the stack represents the execution flow of the application. When an application is executing correctly, in the absence of an exploit or the triggering of a bug, the stack ensures that active functions will return correctly to their intended calling functions.

The goal of many exploits is to get applications to perform a function for the attacker instead of or in addition to the functions the application was designed to perform. Several avenues are available for the attacker to follow, ranging from exploitation of passive vulnerabilities to sophisticated software engineering, all with the aim of inducing an application to execute instructions of the attacker's choosing. In the discussion of these various techniques below, it will be seen that the execution stack is a common thread that can become a tool for defeating attacks that target application control.

Flaws or errors, generally referred to as software bugs, exist in almost every application. These software bugs arise from incorrect design, coding, and assembly of computer programs. While following good practices in software design, coding, and testing reduces software bugs, it seldom eliminates them. When a software bug in an application is encountered during program execution, the instructions associated with that bug may result in corruption of data or memory and cause the program to crash. More insidiously, the program may continue to run despite damage. Buffer overflow attacks deliberately trigger such bugs and take advantage of the ensuing corruption of the stack region of memory to wrest control of execution of the application and get instructions of the attacker's choosing into application memory. The attacker's instructions divert the application to execute code he/she supplies instead of the functions that were intended.

In some advanced attacks, attackers may not even inject new code into the application, but instead exploit legitimate functions to which the application has linked to carry out their malicious actions. Return-to-libc attacks, for example, use functions from libc, the standard library for the C programming language, to gain unauthorized access. Since the success of such attacks hinges on knowing the precise address of the function to be coopted, randomization of the load address of libc was introduced as a defense mechanism to mitigate them. With libc loading at a new address every time the program starts; the exploit cannot use a fixed address to call functions from libc as part of its attack. While this technique was initially successful, it was soon learned that address space layout randomization could be bypassed by obtaining the address of libc functions from the procedure linkage table (PIT) of the program or the Global Offset Table (GOT).

Recently a new class of attacks based on return oriented programming (ROP) has emerged which is able to defeat all existing methods for preventing exploits. These attacks provide the attacker with a fully functional language that is Turing-complete. Using ROP, the attacker can craft gadgets out of snippets from the code of the target application to implement any action he desires without injecting any detectable code during the attack. Some attempts have been made to apply address space randomization ideas to the structure of a program to prevent successful use of gadgets created from the application. Unfortunately, these methods impose additional cost, introduce compatibility challenges with existing monitoring tools, and do not offer guarantees that they will be robust against as yet unseen attacks.

Examination of the stack of the application provides a way to detect the presence of all the attacks mentioned above. Since the stack controls and reflects how the process is executing, if an attacker has diverted the application off to do his bidding, at runtime the stack of the exploited application will not be consistent with the function calls that were initially part of the program. The frames on the stack will, for example, now represent the calling sequence of the code injected by the attacker instead of the original sequence of legitimate function calls.

A more comprehensive analysis of the application stack, though, does have the potential to provide a deterministic answer to the question of how to detect the presence of attacks or exploits. Analysis of stack frames via stock walking has applications in security, debugging, garbage collection, and exception handling, etc. As an example, a common debugging technique involves examining the frames on the stack of an application under development to trace the source of the problem. Stack walking can, however, be a challenging problem, as compilers often omit the frame pointers that would delineate individual frames on the application stack to save memory and processing. For most function calls, the compiler has a way to compute and track stack adjustments for the function call using simple arithmetic instructions without the overhead of reserving a register for that purpose.

Most stack-walking methods require the user to execute the application and manually analyze the stack to detect loaded frames on the stack. Automating stack walking not only offers benefits for resolving bugs and analyzing crash dumps, but it provides a path for detecting attacks on the application via validation of the application stack at runtime.

Accordingly, improvements to method of stack validation in cybersecurity, as well as program analysis, are needed. However, there are still significant gaps in its utilization by systems and methods to validate the runtime state of applications. The needed solution may not take away functionality in order to improve security. The security mechanism should work seamlessly and without requiring any input from the user. This invention describes a fundamental advance in how the runtime stack of an application can be automatically analyzed and validated to detect or rule out the presence of an attack.

SUMMARY

In one aspect, a computer-implemented method for monitoring and validating execution of an executable binary code, includes the step of, prior to beginning execution of the executable binary code, disassembling the executable binary code, listing all of application programming interfaces (API) or function calls in the executable binary code, generating a validation table for a type of each of the APIs or each of the function calls, a location of each of the APIs or each of the function calls, and a return address of each of the APIs or each of the function calls in the executable binary code, and listing in the validation table the type of each of the APIs or each of the function calls, the location of each of the APIs or each of the function calls; for every function in the executable binary code in the executable binary code: scanning the executable binary code for a stack setup instructions, scanning the executable binary code for a stack unwind instructions, and determining an effect of the set of instructions on the stack; creating a rule set for an unwinding of the stack frame operation for each function call in the executable binary code; storing the rule set for the unwinding of the stack frame operation in an unwind table; inserting a monitoring and validation hook, wherein monitoring and validation hook performs validation of the runtime stack of the stack setup during execution of executable binary code and after receiving a specified signal; at runtime, the monitoring and validation hook: waits for the specified signal to perform stack validation, wherein the specified signal comprises a system call, obtaining a set of values for the stack and the set of instruction pointers, obtains, from the unwind table, the unwind arithmetic for the function being executed based on the value of the instruction pointer, unwinds a stack frame of the stack, obtains a value of the return address from the function call, uses the validation table to validate the return address as being consistent with a call to and return from the function associated with the stack frame, and taking a default action when a rule violation is detected for a frame on the stack during the execution of the binary code.

In another aspect, a method useful for validating execution of an application through runtime validation of a stack of an executable binary code in a computer system, comprising the steps of: prior to initiating execution of the executable binary code: disassembling the executable binary code, listing all of application programming interfaces (API) or a function calls in the executable binary code, generating a validation table for a type of each API or a function call type, a location of each API or a function call type, and a return address in the executable binary code of each API or a function call type, and listing the type and locations of each API or a function call type in the executable binary code; for every function in the executable binary code: scanning a code for a stack setup instructions, scanning the executable binary code for a stack unwind instructions, and computing an effect of the set of instruction on the stack and an associated set of instruction pointers; creating a rule set for unwinding a stack frame for each function call in the executable binary code; inserting a monitoring and validation hook, wherein the monitoring and validation hook performs validation of the runtime stack during execution of executable binary code, after receiving a specified signal; in monitoring mode: executing an application binary code, sampling an associated application stack when triggered by the specified signal, sequentially unwinding a set of stack frames of the application stack until the stack frame returns an address pointing to a specific memory region is reached, determining an offset from a stack pointer to a location of the return address in a last stack frame, and generating an unwind table for recording an offset from the current stack pointer to the location of return address to the code in a specific memory region; and at runtime, with the monitoring and validation hook: waiting for the specified signal to perform a stack validation operation, wherein the specified signal comprises a system call; obtaining a stack value and an instruction pointer value; obtaining an unwind table to obtain the offset for the return address from a call to a function; unwinding the stack frame and obtaining a value of the return address from the function call; looking up an API call location in a lookup table to validate the return address as being consistent with a call to the stack frame; and implementing a default action when a rule violation is detected for a frame on the stack during the execution of the binary code.

In accordance with another embodiment of the current invention: the application stack is recorded, the application binary is disassembled, the locations of instructions leading to manipulation of the stack are listed, multiple stack frames are unwound, the offset of the return address on the stack from a specific function call or an API call is computed by code analysis, the value of the return address and offset of the address on the stack are stored in a stack unwind table, during the execution of the application returns from function calls are monitored, the return address on the stack is obtained based on the stack unwind table, and the return address is validated as a legitimate return address for the function call.

In accordance with another embodiment of the present invention, a client monitors execution of an application and collects multiple stack events, the client reports the collected events and the application binary file to a server, the server disassembles the application binary, the server generates a map to validate function calls based on the return address on the stack, the server unwinds the collected stack and generates a stack-unwind table to unwind stack frames for any given function call, the server sends the table to the client and the client uses the table to unwind and validate the stack. Splitting the work between the client and the server reduces the load on the client, and multiple clients can share the same lookup tables without having to re-create the tables by themselves. In a variation of the second embodiment, once the server has created the rule list, it sends the list to the client, and the client validates events. Splitting the work in this way cuts down on network activity, but still keeps the compute-intensive tasks at the server.

BRIEF DESCRIPTION OF THE DRAWINGS

FIG. 9 illustrates an example process for disassembling to generate rules, according to some embodiments.

Figure 1:
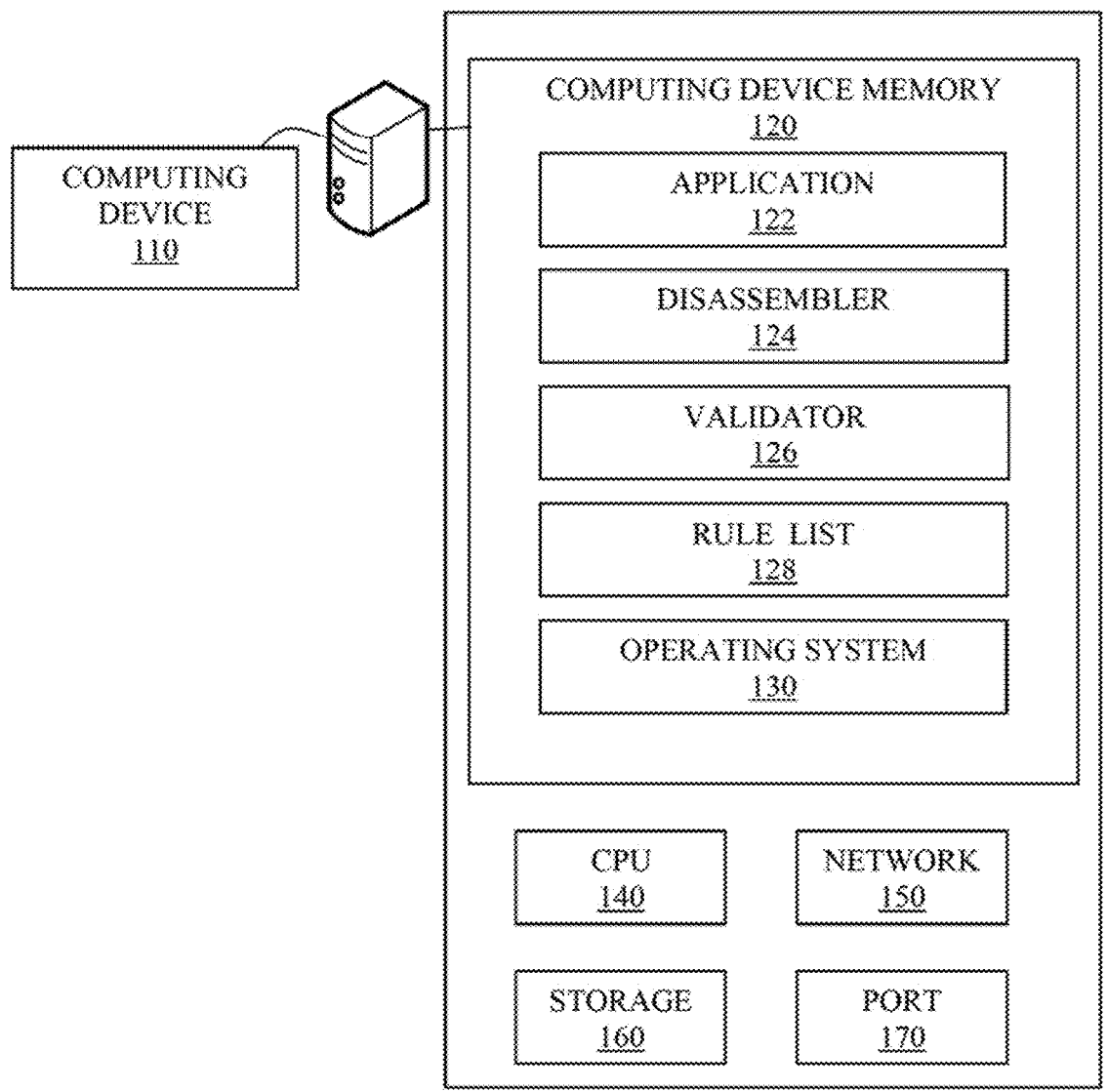
FIG. 1 illustrate an example system utilized to implement some example embodiments.

The Figures described above are a representative set, and are not an exhaustive with respect to embodying the invention.

DESCRIPTION

Disclosed are a system, method, and article of manufacture for exploiting attack detection by validating application stack at runtime. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

An application programming interface (API) is a set of subroutine definitions, protocols, and tools for building application software. An API call can include system calls (e.g. a debugger, etc.) and API calls to library functions. System calls are special class of API calls that wrap privileged instructions.

Control transfers in a computer program can be instructions that direct the flow of execution of the program. JMP, CALL, RET, IRET, and INT are examples of control transfer instructions.

Dynamic linked library (DLL) refers to a program module providing a set of API calls. The use of a DLL can enable modularized programs. A DLL can be used to interface with the operating system.

Disassembly of a binary code is the process of converting machine-executable instructions into human-readable assembly code.

Dynamic analysis refers to execution of an application in a sandboxed environment in order to observe, record, and analyze its actions.

Executable binaries can be files that contain a computer program in a form that can be executed on a computer. These files are formatted so that the computer can load them into memory and directly execute the instructions within them. Examples of executable binary code are executable applications, DLLs, kernel modules, etc.

An event is information collected about the state of a process, including register values, application stack, application process map, and application file attributes.

A hypervisor can be computer software, firmware or hardware that creates and runs virtual machines.

Hooking refers to a range of techniques used to alter or augment the behavior of an operating system, of applications, or of other software components by intercepting function calls or messages or events passed between software components. A software hook can be a set of code that handles such intercepted function calls, events or messages.

Libc is commonly used as a shorthand for the 'standard' C library (e.g. a library of standard functions that can be used by various C programs).

A Procedure Linkage Table (PLT) can be used to manage external function calls by shared libraries. Located within the executable text section of the process image, it includes an entry for each external function the shared library calls. Each PLT entry is a short chunk of executable code that calls a function.

The processor register is a small area of memory typically used to hold data that needs to be accessed quickly by the computer processor.

Return-oriented programming (ROP) is a computer security exploit technique that is robust against security defenses such as non-executable memory (Write XOR Execute technique) and code-signing.

The stack frame is a collection of all data stored on the stack associated with a given function call.

A Virtual Machine Manager (VMM) is a desktop-driven process with which users can create and manipulate virtual machines (VM).

Exemplary Systems and Methods

An objective of one example embodiment of present invention is to analyze and validate a runtime stack of an application in an automated fashion. Automation of stack analysis can help detect a cyber-attack (e.g. when an adversary exploits various vulnerabilities in one or more applications executing on a computing device to gain unauthorized access, etc.). Efficient stack analysis can also improve the process of debugging applications and localizing errors in computer programs. It is noted that when an application is functioning properly, a state of the stack can be consistent with a call graph of the application and the caller-callee relationships it expresses.

In one example embodiment, an application binary can be disassembled. The runtime stack of the application can be monitored. Values of program counters and registers can be collected. Frames on the application stack can be unwound based on instructions contained in the disassembly of the application binary and the variables relevant to unwinding the frame. The return address on the stack can be checked for consistency with the call graph of the application.

In one example embodiment, the application binary can be disassembled. A table for caller-callee relationships can be built. A table for unwinding the stack at the return from each callee function can be built. The application execution can be monitored. API calls can be trapped. The application stack can be analyzed at the time of each API call. The stack can be unwound frame-by-frame to associate the frames on the stack to the known return locations from function calls within the application.

In yet another example embodiment, the application stack can be recorded. The application binary can be disassembled. The locations of instructions leading to manipulation of the stack can be listed. The multiple stack frames can be unwound. The offset of the return address on the stack from a specific function call or an API call can be computed by code analysis. The value of the return address and offset of the address on the stack can be stored in a stack unwind table. During the execution of the application returns from function calls can be monitored. The return address on the stack can be obtained based on the stack unwind table. The return address can be validated as a legitimate return address for the function call.

In another example embodiment, a client monitors execution of an application and collects multiple stack events, the client can report the collected events and the application binary file to a server. The server can disassemble the application binary. The server can generate a map to validate function calls based on the return address on the stack. The server can unwind the collected stack and generates a stack-unwind table to unwind stack frames for any given API call. The server can send the table to the client and the client uses the table to unwind and validate the stack. Splitting the work between the client and the server can reduce the load on the client. Accordingly, multiple clients can share the same lookup tables without having to re-create the tables by themselves. In a variation of this embodiment, once the server has created the rule list, it can send the list to the client. The client can then validate events. Splitting the work in this way can reduce on network activity, but still maintain the compute-intensive tasks at the server.

In accordance with another example embodiment, a client can report the application binary file and observed events to a server. The server can disassemble the application binary and generates rule lists to unwind stack frames and validate the stack.

In another example embodiment, the work can be performed on the executing computer. The code of the application to be executed can be disassembled and scanned for API calls. A rule list based on API calls and their locations in the software can be created. The software hooks can be placed in the code for monitoring API calls during program execution. The computer can execute the program and validate each observed API call in turn. The computer can then and take appropriate action (e.g. terminate the application, generate an alert, quarantine the application, etc.).

FIG. 1 illustrate an example system 100 utilized to implement some example embodiments. It is noted that system 100 can apply the same disassembly and validation steps within the same computing device. The system 100 includes a client(s) 110. Client(s) 110 can execute a range of applications 122. In its memory 120, the client 110 executes a disassembler 124 and a validator process 126. A disassembler is tool that converts an executable binary code into human readable assembly language instructions. Validator process 120 can perform runtime validation of the application stack and detect inconsistencies. Validator process 120 can be implemented as an application, kernel module, hypervisor, or DLL. Validator process 120 can monitor the assemblage of applications executing in the memory 120 of the client. Accordingly, validator process 120 can monitor events. Validator process 120 can analyze and validate the application stack. Validator process 120 can detect attacks on application(s) 122. In some examples, the monitoring, analysis and validation of the stack by the code can be implemented by validator process 120.

Computing system 110 can include additional components including, inter alia: computer processing unit (CPU) 140, storage device 160, network device 150, and input/output port 170. While the computing system illustrated here has been illustrated with a single CPU, storage device, network device, and input/output port, it is noted that other example configurations of the computing system can incorporate a plurality of these individual components. The computer system may further include random-access memory (RAM), erasable programmable read-only memory (EPROM), read-only memory (ROM), compact disk ROM (CD-ROM), storage area network (SAN), or any other storage medium.

Figure 2:
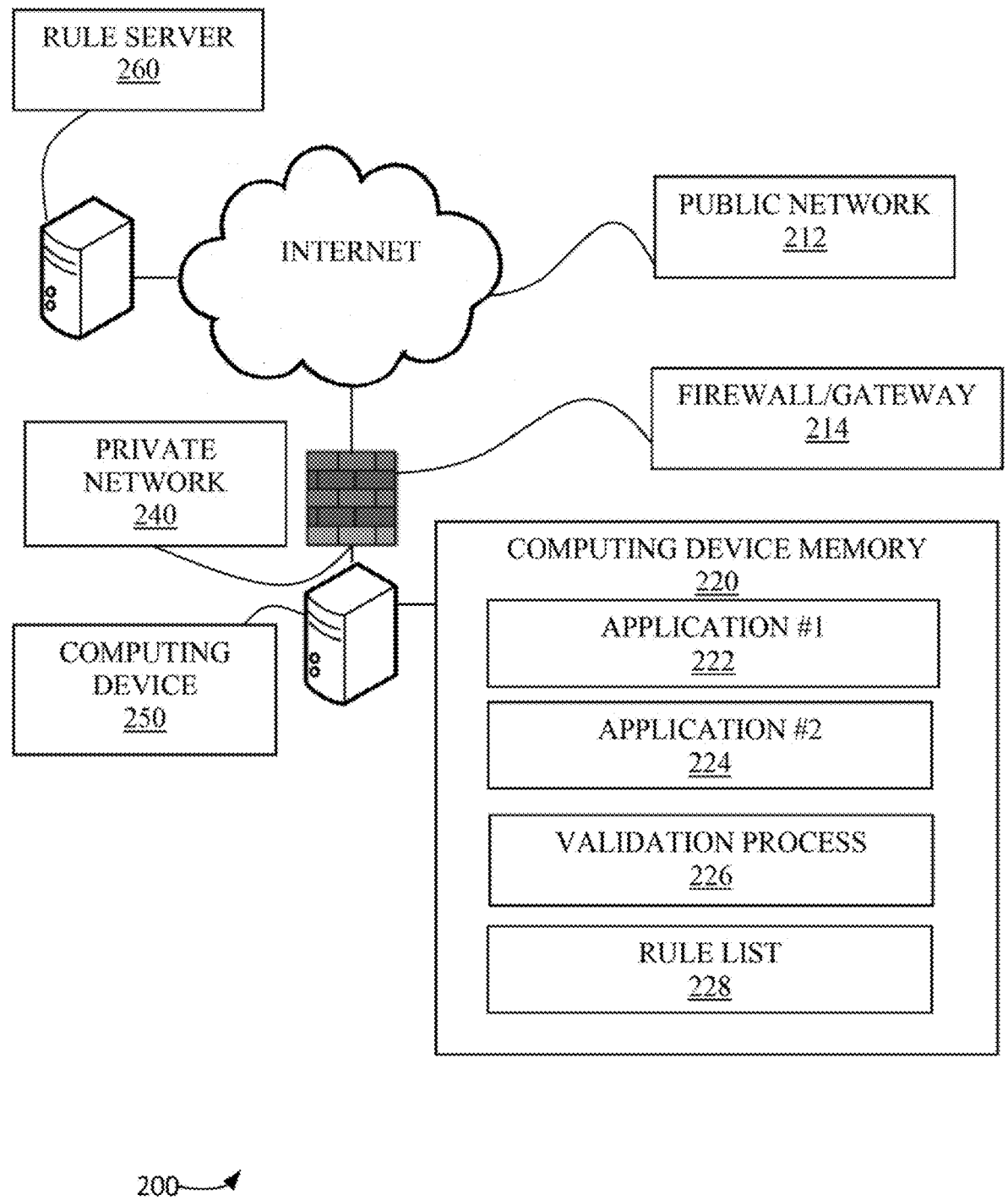
FIG. 2 illustrates a block diagram of a computer network, according to some embodiments.

FIG. 2 illustrates a block diagram of a computer network system 200 useful to implement some example embodiments. Client computing device 250 may executes several applications that contain vulnerabilities. These vulnerabilities can be exploited by an attacker to gain unauthorized access to client computing device 250. Client computing device 250 is connected to network 200. Computer network system 200 between client computing device 250 (e.g. a client computing node) and the attacker may include a range of components such as routers, switches, firewalls, content proxy, proxies, and other hardware, that route the data transmitted between the client computing node and the attacker. The network between the client computing node and the attacker can be a public network 212 or a private network 240 and/or any combination thereof. Client computing device 250 can be computing devices such as, inter alia: a personal computer, notebook, workstation, server, smartphone, or the like. While the illustration 200 depicts only one client computing node, the embodiments of the computer network system may contain multiple instances of each.

Client computing device 250 executes a range of applications 222, 224. Application 222, 224 can include vulnerabilities that could be targeted and exploited by the attacker 210. In the memory 220 of client computing device 250 a validation process 226 can be executed. Validation process 210 can detect any attempts to exploit vulnerabilities in the code of applications executing on client computing device 250 by monitoring and validating the stack of said applications. Validation process 210 can be implemented as a service, application, DLL, kernel module, or hypervisor. Validation process 210 monitors the assemblage of code executing in the memory 220 of the client. Validation process 210 monitors the application stacks. Validation process 210 can validates the application stacks using rule list 228 for each code. Validation process 210 can implement a default action when a violation is detected. In one example embodiment, monitoring, validation, and enforcement of the stack of the code can be separate processes. In another example embodiment, the observed stack contents at the computing device 250 can be reported to rule server 260. Rule server 260 can apply the rule set to validate the stack and detect the presence of an attack.

Figure 3:
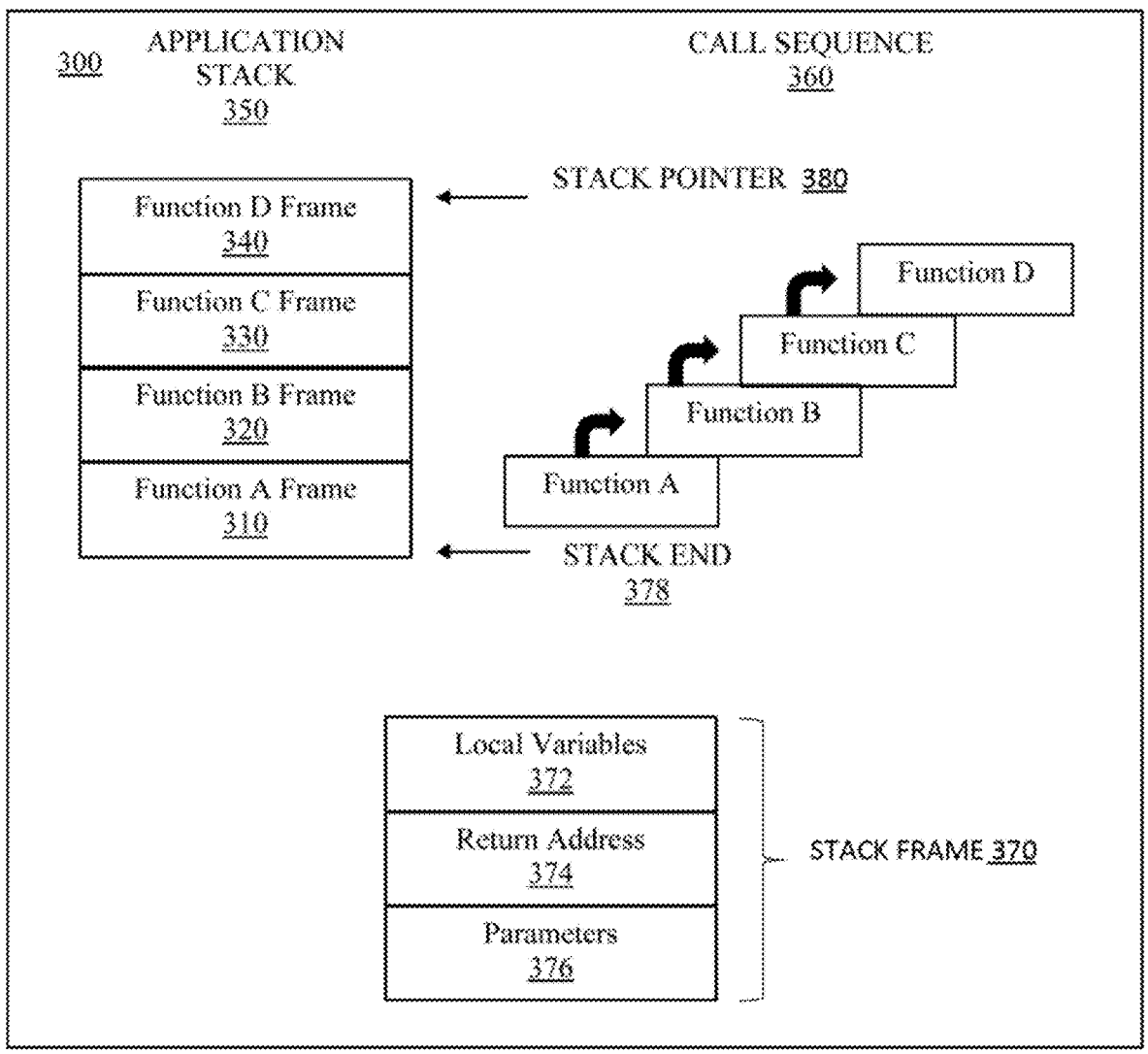
FIG. 3 illustrates an example of an application stack to be validated, according to some embodiments.

FIG. 3 illustrates an example process 300 of an application stack 350 to be validated, according to some embodiments. It is noted, that while the example application stack 350 is illustrated based on four active functions, the actual number of frames on the stack can be varied. The frames on the stack represent currently active function call sequence that is part of the call graph of the application. New frames are added to the top of the stack and the stack pointer 380 gives the stop of the stack. Each active function pushes a frame 310 320 330 340 onto the stack. The validation process unwinds the stack, examining each frame on the stack in sequence, starting with the frame on top 340, and verifying that the return from the function for that frame is consistent with the address of the function that was expected to have called it, i.e. the next frame. Each stack frame 370 on the stack comprises of local variables 372, return address 374, and parameters 376 supplied to the function. The validator unwinds the stack frame, consulting the rule-list lookup table to obtain the location of the next frame to be processed. For each stack frame, the validator also verifies that the return from that stack frame represents a valid return address for the function. The stack end 378 is reached when all frames on the stack are removed.

Figure 4:
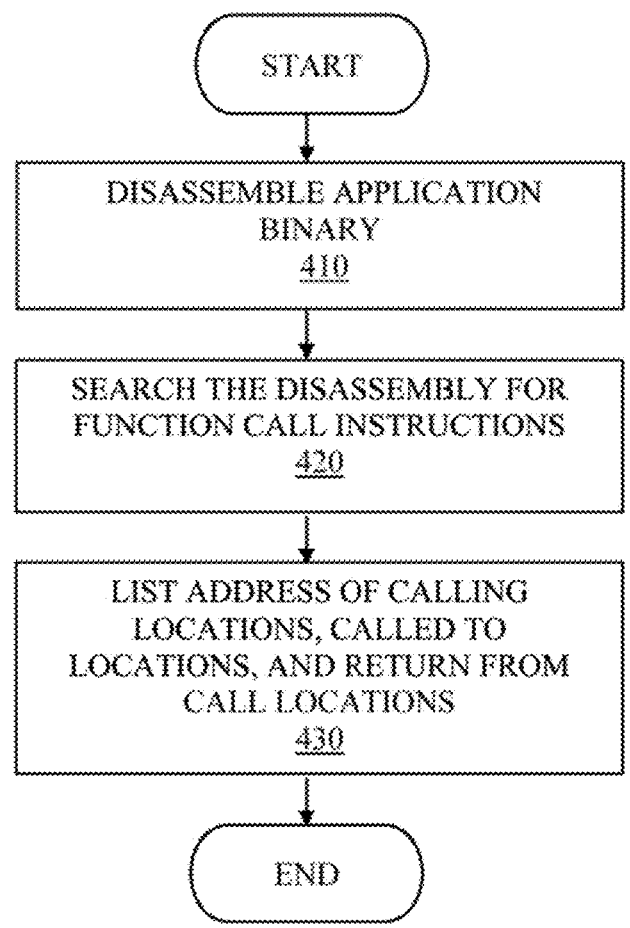
FIG. 4 illustrates an example process illustrating the generation of the first set of rules used in the validation of the stack frame, according to some embodiments.

FIG. 4 illustrates an example process 400 illustrating the generation of the first set of rules used in the validation of the stack frame, according to some embodiments. The application binary is disassembled in step 410. From the disassembled code, the locations of function calls are recorded in step 420. The function calls may also include system calls and API calls to library functions. Based on the detected function calls, a rule list is generated in step 430. The rule list can specify the calling location, location of the target, and location of the return address for each call.

It is noted that the stack frame validator can use this rule list to verify that the return address on the stack frame is consistent with the function the call is returning from. Validation also ensures that each recorded API call is consistent with the binary structure of the code. The rule list for any execution application or binary code can include rules for every module that is part of the application process. Since a rule specifies various memory addresses involved in the function call, two different versions of the same application may have different rules. The rule list can also be modified based on the load address of the modules used by the process. The exact rule can depend on the version of each module and may vary significantly for two versions of the same application.

Figure 5:
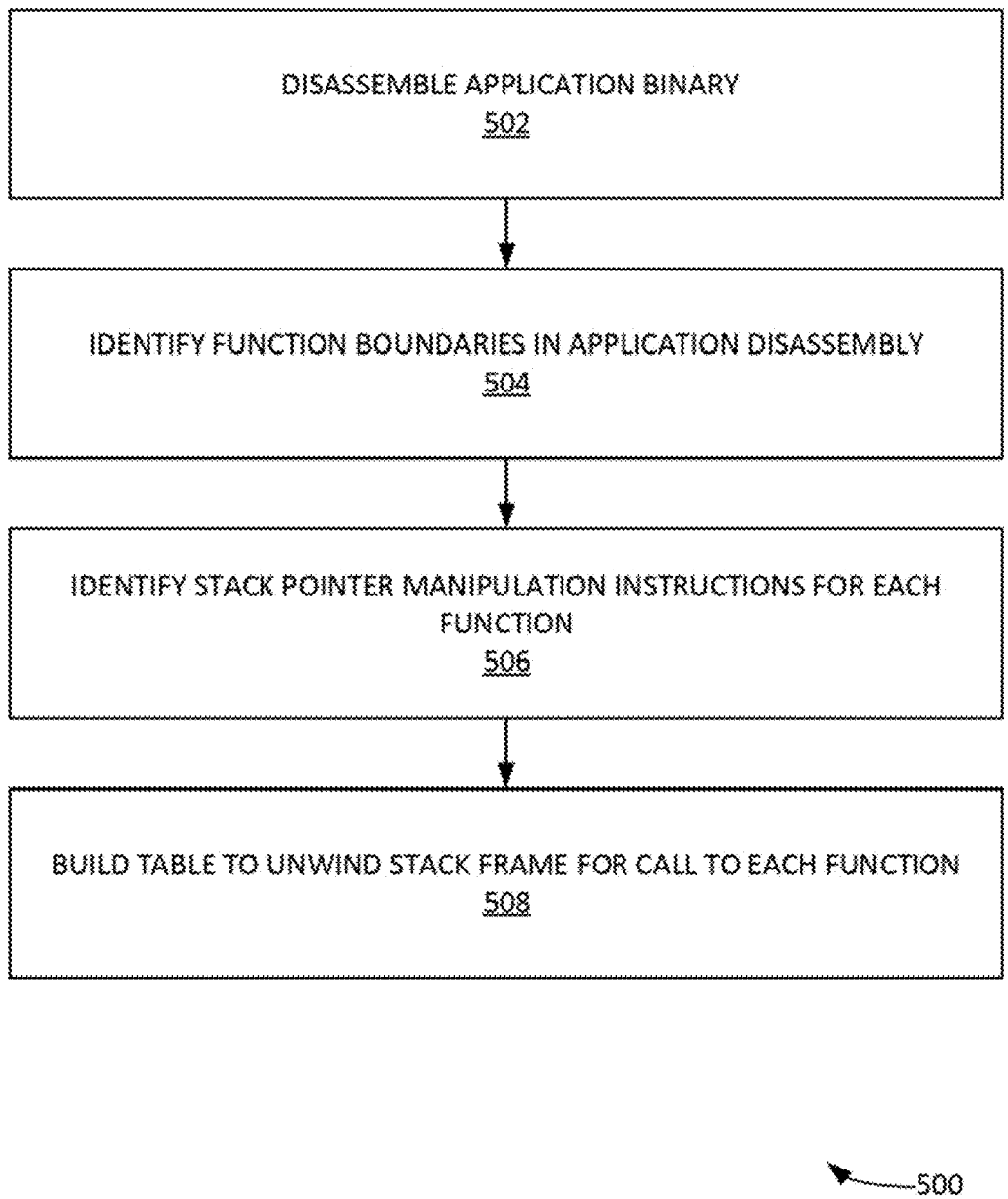
FIG. 5 illustrates an example process for generating the rule list for unwinding stack frames from the application stack, according to some embodiments.

FIG. 5 illustrates an example process 500 for generating the rule list for unwinding stack frames from the application stack, according to some embodiments. An application binary or module is disassembled in step 510. The resulting disassembly is analyzed to obtain function boundaries in step 520. For each function uncovered in the disassembly, instructions related to stack manipulation are identified in step 530.

Control flow of the function can be used to determine the arithmetic for stack setup and stack unwind operations. Consistency between the stack setup and stack unwind operations is checked. If the stack setup and stack unwind operations do not result in a variable stack frame, a rule for unwinding the stack frame can be and is added in step 540.

Figure 6:
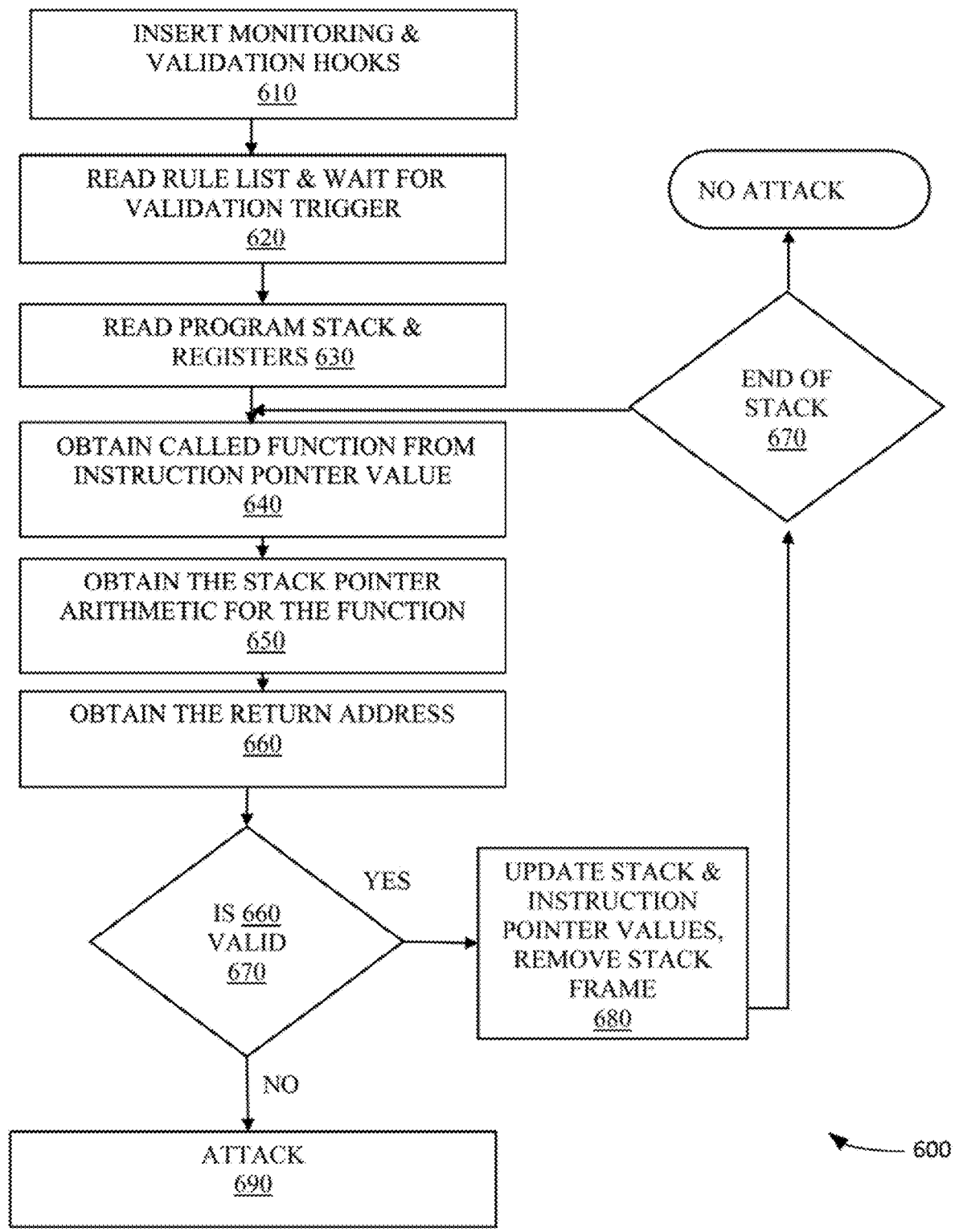
FIG. 6 illustrates an example disassembler and validation process for determining the presence of an attack via stack validation, according to some embodiments.

FIG. 6 illustrates an example disassembler and validation process 600 for determining the presence of an attack via stack validation, according to some embodiments. Stack validation can be accomplished during the execution of applications via sequential validation of individual frames on the stack. In step 610, monitoring and validation hooks are placed. These monitoring and validation hooks can be either system-wide and/or for each process and/or module. The validation process enumerates applications on the computing device by scanning the storage media attached to the computing device or by monitoring any process starting or modules executing on the computing device. The rule list for each module is loaded, and the hooks monitor for application state and events that will trigger application stack validation in step 620. An example of an event that could trigger stack validation is a system call executed by the application. Another example of generating a trigger is to insert a probe into the application so that when the execution of the application reaches the probe, a trigger event will be generated.

When an event is received that triggers stack validation, then in step 630, the validation process reads the application stack and registers and applies the first rule list to sequentially unwind frames on the stack and validate them. The function associated with the stack frame is obtained from the instruction pointer value in step 640. The first rule list is checked to determine if a rule is available that gives the frame pointer arithmetic to unwind that frame from the stack and obtain the return address from the stack frame in step 650. When a rule is not available, the size of that function frame can be variable, and the compiler can have provided a frame pointer. This value can be used instead to unwind the frame and obtain the return address from the frame. The return address for the stack frame is obtained in step 660. A second rule list (e.g. a validation table) is used to vet the return address and the call location of the function associated with the current frame in order to validate the caller-callee relationship in step 670. If the second validation is successful, the stack frame is removed, and the stack pointer and instruction pointer values are updated.

This mechanism can be sequentially applied until the end of the stack is reached. The stack unwind can also be stopped when the originator of the function call reaches a specified module. In the event the validation falls, an attack is registered and the function corresponding to the stack frame that failed validation is marked as the target of the attack.

The code for validation of the stack can also be used in monitoring mode to generate a rule list dynamically. In monitoring mode, upon encountering a stack validation failure an event is logged, and the code execution is allowed to proceed. The generated event can be validated locally or transmitted to a remote location for validation.

The frame-by-frame unwind can provide a deterministic method to validate the application stack at runtime. However, as the number of frames on the application stack increases, the time to perform validation increases linearly. In one example, the efficiency of validation can be improved by combining the validation of multiple frames in one.

Figure 7:
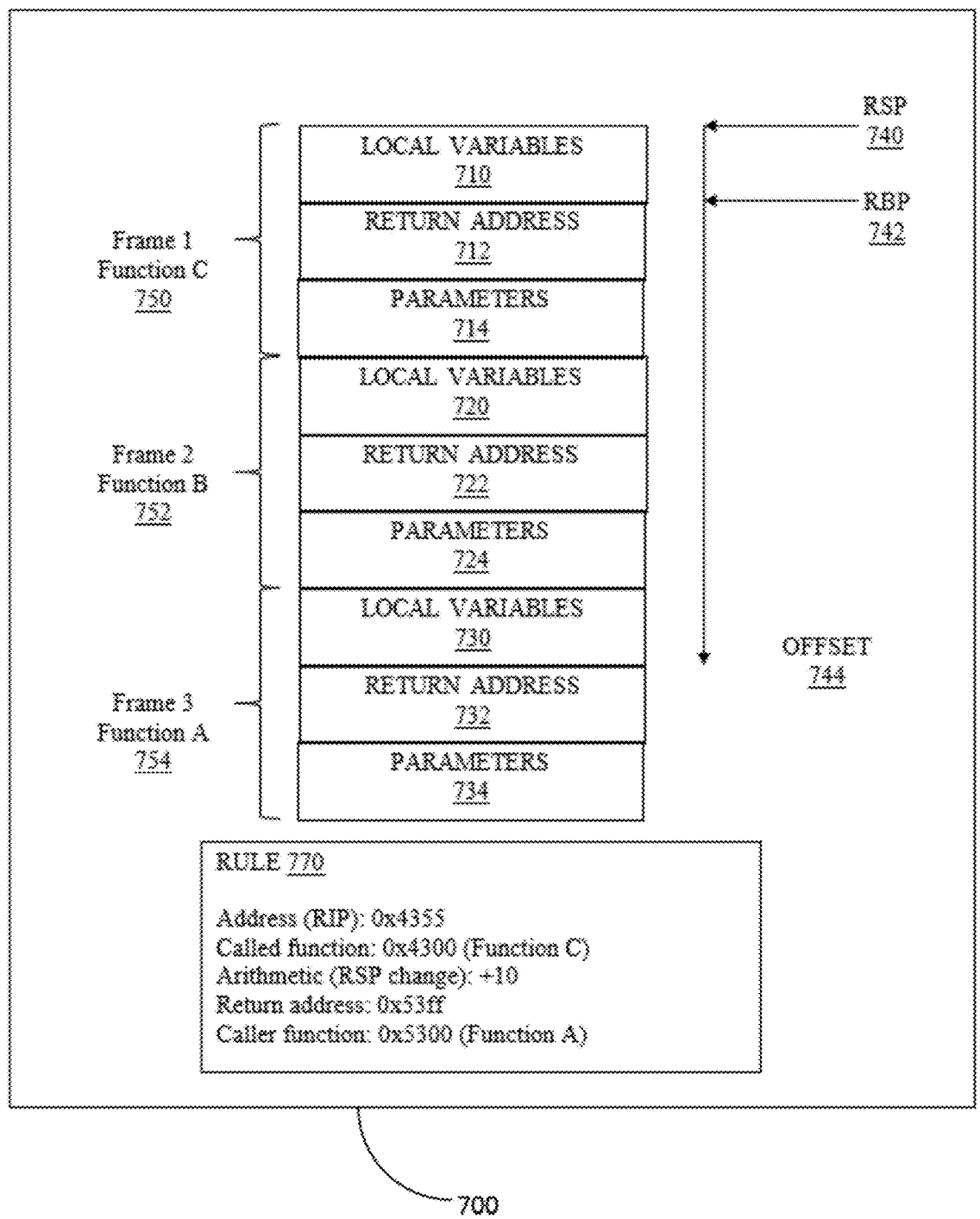
FIG. 7 illustrates an example multiple frame unwind through one action, according to some embodiments.

FIG. 7 illustrates an example multiple frame unwind through one action 700, according to some embodiments. The stack of the application shows three frames 750 752 754. Each frame comprises of local variables 710 720 730, return address 712 722 732, and parameters 714 724 734 for the function call. The stack pointer (RSP) 740 points to the top of the stack and is adjusted when a new frame is added to the stack. The frame pointer (RBP) 742 is used to store the value of stack pointer in case stack pointer is adjusted to make space for local variables. For stereotypical function calls with fixed frame size, multiple frames can be unwound and validated in one operation. Frame 1750 represents a call to function C from function B, and frame 2 752 represents a call from function A to function B. If both frames are validated, then action 700 can add a new rule 770 that combines the unwind of the two frames into one. The new offset 744, which combines the unwind arithmetic for frame 1 and frame 2, is added to the rule.

Figure 8:
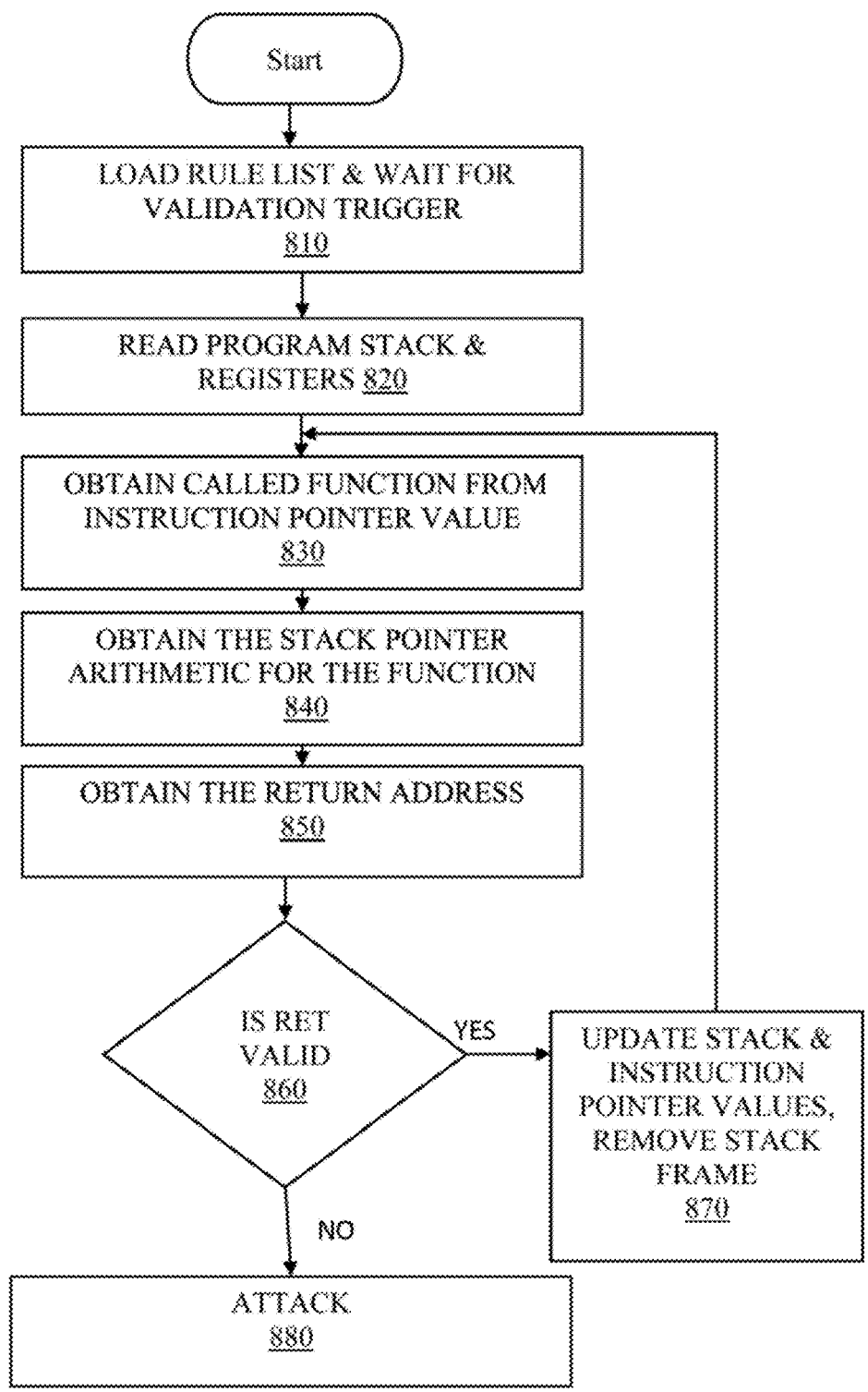
FIG. 8 illustrates an example process for validating multiple stack frames with a single rule check, according to some embodiments.

FIG. 8 illustrates an example process 800 for validating multiple stack frames with a single rule check, according to some embodiments. Rules for combining multiple unwinds are generated as described in process 700 of FIG. 7. The rule list is loaded. The validator can wait to be triggered to perform stack validation in step 810. Upon receiving the trigger, the validator loads the CPU registers and application stack in step 820. The frame pointer register is used to identify the function being called in step 830. The observed addresses are converted to canonical addresses by recognizing and factoring in the load addresses of each dynamically-linked module and the application. The rule list is used to obtain rules corresponding to the function call in step 840. Each rule contains arithmetic for multiple stack frame unwind and the location of the return address for the function in step 850. The return address is checked for consonance with the information in the rule list about the calling location and return-to location of function calls in step 860. If the validation fails, an attack event is registered in step 880. If the validation is successful, then the values of the CPU registers are updated, and the validation process continues in step 870. The validation process stops when the end of the stack, or a specified module is reached.

The generation of the rule set for multiple stack frame unwind provides that each stack frame in the unwind group have a fixed stack frame length and that the call sequence be known. The call sequence can either be recovered statically, by performing control flow analysis of the application, or dynamically, by monitoring the execution of the application under controlled conditions. In the latter case, a test environment is setup to monitor execution of the application. Application state is collected when the application executes an API or system call. Frames on the application stack can be sequentially unwound, and arithmetic for each unwind operation is recorded, until one reaches the start of libc or an API calling location in the application. The frame lengths of each unwound from the stack can be added together to build a rule for unwinding multiple stack frames.

FIG. 9 illustrates an example 900 for disassembling and application binary to generate rules, according to some embodiments. The disassembly of the application 910 shows an API call to libc at address 0x43e0 and then an API call by libc at address 0x1fb47. Two rules are generated. The first rule 920 specifies the location type and target of the API call at address 0x43e0. The second rule 930 is for the API call to the kernel. The rule states the address, instruction, and target type. The target address is not specified, as the API call is to the kernel and involves a context switch.

Figure 10:
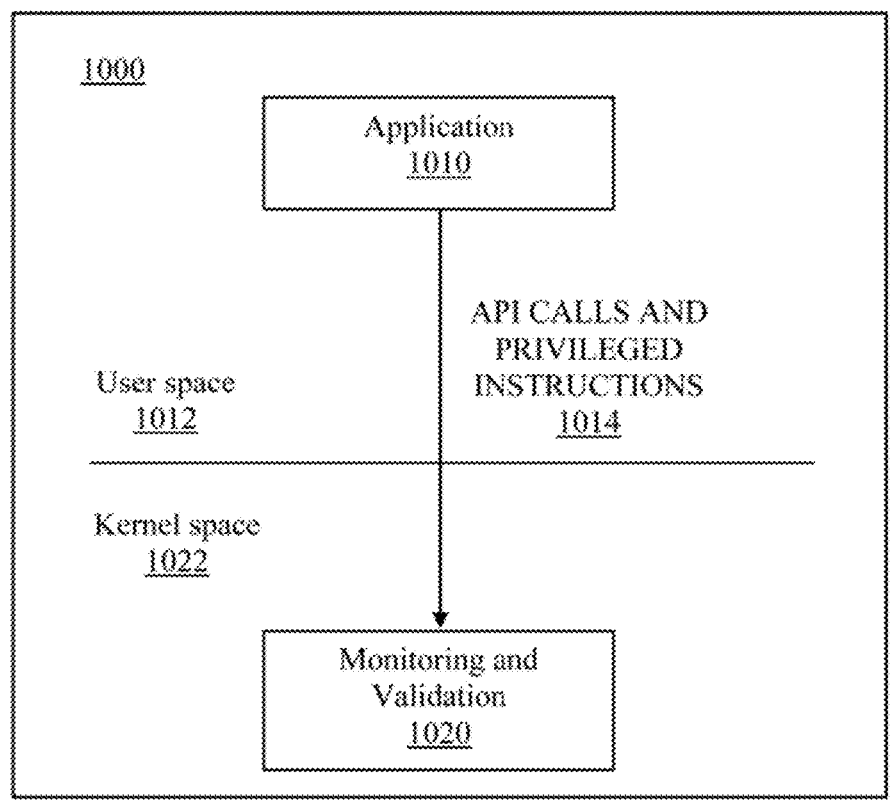
FIG. 10 illustrates an example of a trigger event used to initiate validation of the application stack, according to some embodiments.

FIG. 10 illustrates an example 1000 of a trigger event used to initiate validation of the application stack, according to some embodiments. It is noted that in example 1000, no modifications to application 1010 are necessary to perform validation, as monitoring and enforcement are performed in kernel space 1022 and not in user space 1012. The trigger for executing the stack validation is an API call made by the application. The hooks for monitoring API calls by the application are placed in the kernel space 1022. These hooks may be system-wide or specific to the application. Use of system-wide hooks can enable the kernel module 1020 to monitor API call 1014 execution. An example of such a hook is the placement of kernel probes in the LINUX kernel. By adding a probe for each API call, it becomes possible to generate a trigger to validate the application stack before an attacker can cause any damage. A kernel probe will collect events broadly, so such an implementation would also include a separate mechanism to filter the events and assign them to their respective process or application. In addition to recording the API call, additional information can be collected to improve the analysis of the application stack. This information includes the value of the CPU registers, kernel stack, and application stack. It is noted that there may be multiple ways to generate trigger events for performing validation of the application stack from the kernel.

Figure 11:
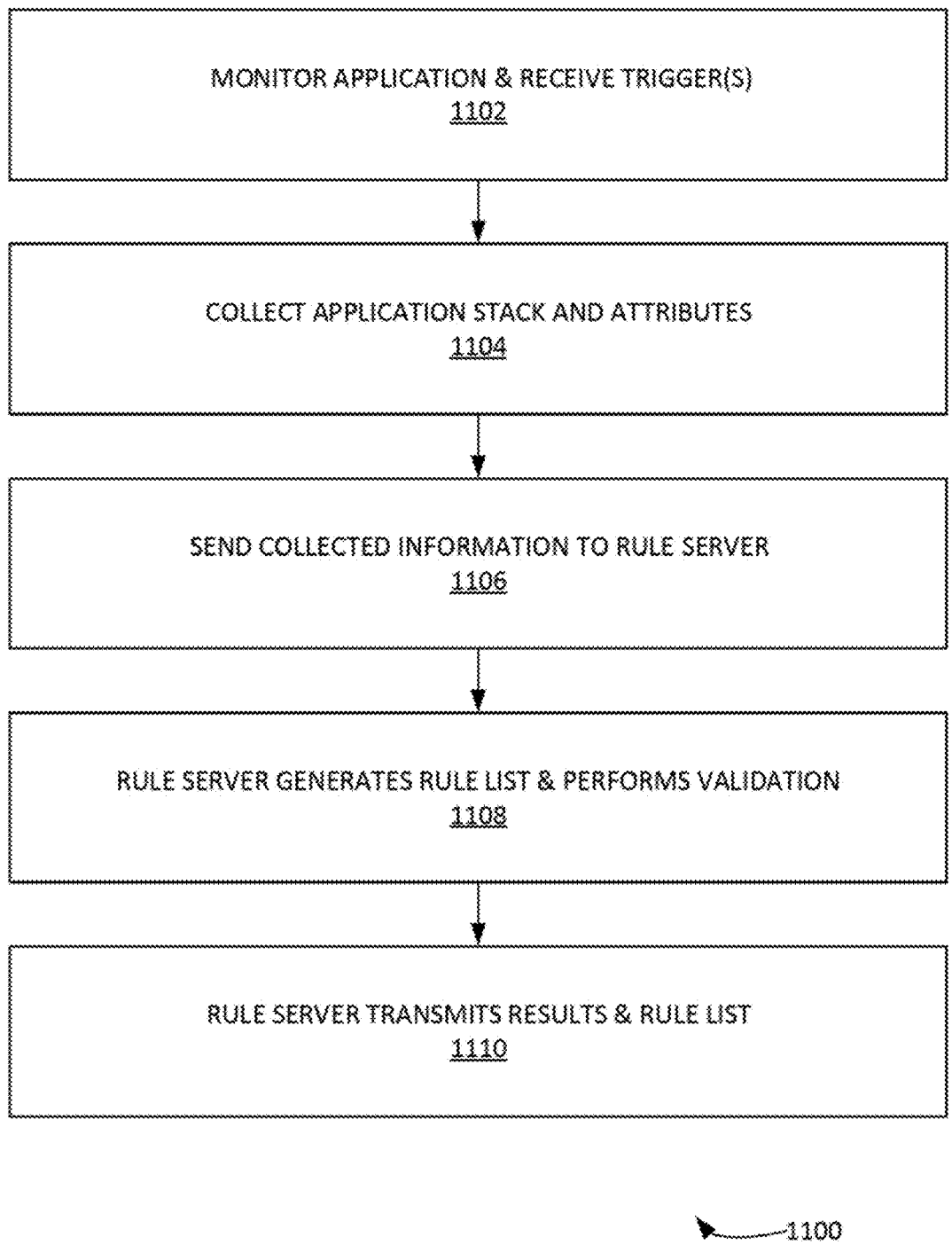
FIG. 11 illustrates an example process of application stack validation and rule generation, according to some embodiments.

FIG. 11 illustrates an example process 1100 of application stack validation and rule generation, according to some embodiments. In step 1110, application execution is monitored and triggers for stack validation are received. Upon receiving a trigger, application stack, application attributes, and system state are recorded in step 1120. System state includes the processor state and register values, as well as application binary, layout of all the modules in the memory of the process, etc. Collected events are transmitted to the rule server in step 1130. In step 1140, the rule server analyzes collected events to generate the stack unwind and stack frame validation rules. The received stack frame is validated using those rules. The result and new rule list are sent to the client in step 1150.

Returning to FIG. 2, the rule list 228 can also be dynamically updated during execution. In one example, the rule list 228 is continually updated as client computers execute applications. The validation process 226 monitors the application stack and periodically communicates with the rule server 260 to download updates to the rules. In another example, this information is collected by executing the applications in monitoring mode. Each executing application ca be observed for API calls, and the collected application stack, application attributes, and system state information are reported to the rule server 260. The rule server analyzes all collected data for any given application for consistency with samples collected from other clients. The samples can also be collected by directly executing applications in a controlled environment. A rule can be added to the rule list if the derivation of the rule for any given instance of an application is consistent with all other instances of that application.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method for monitoring and validating execution of an executable binary code, comprising the steps of:
   prior to beginning execution of the executable binary code:
      disassembling the executable binary code,
      listing all of application programming interfaces (API) or function calls in the executable binary code,
      generating a validation table for a type of each of the APIs or each of the function calls, a location of each of the APIs or each of the function calls, and a return address of each of the APIs or each of the function calls in the executable binary code, and
      listing in the validation table the type of each of the APIs or each of the function calls, the location of each of the APIs or each of the function calls;
   for every function in the executable binary code in the executable binary code:
      scanning the executable binary code for a stack setup,
      unwinding a set of instructions in the stack setup, and
      determining an effect of the set of instructions on the stack of the stack setup and a set of instruction pointers of the stack setup;
      creating a rule set for an unwinding of the stack frame operation for each function call in the executable binary code;
      storing the rule set for the unwinding of the stack frame operation in an unwind table;
      inserting a monitoring and validation hook, wherein monitoring and validation hook performs validation of the runtime stack of the stack setup during execution of executable binary code and after receiving a specified signal;
   at runtime, the monitoring and validation hook:
      waits for the specified signal to perform stack validation, wherein the specified signal comprises a system call,
      obtaining a set of values for the stack and the set of instruction pointers,
      obtains, from the unwind table, the unwind arithmetic for the function being executed based on the value of the instruction pointer,
      unwinds a stack frame of the stack,
      obtains a value of the return address from the function call,
      uses the validation table to validate the return address as being consistent with a call to and return from the function associated with the stack frame, and
      taking a default action when a rule violation is detected for a frame on the stack during the execution of the binary code.

2. The method of claim 1, wherein the executable binary code is an application, a dynamic loaded library, a kernel module, a hypervisor, a firmware, or a memory page.

3. The method of claim 1,
   wherein the binary executable code attributes are reported to a rule server, and
   wherein the corresponding validation and unwind map rule lists are received.

4. The method of claim 1, wherein the stack frames on the stack are unwound until an initiator of the function call is in a specific module.

5. The method of claim 1, wherein an observed API call location is validated by verifying an argument used via analysis of a disassembled structure of the binary executable code.

6. The method of claim 1, wherein the rule list is downloaded from the rule server and used for validating the stack of the application at runtime.

7. The method of claim 1, wherein a validation code executes at a remote location.

8. The method of claim 1, wherein an additional information about a system state is reported to the rule server.

9. The method of claim 1, where a trigger event is obtained via a probe inserted at a specific address into the application.

10. A method for validating execution of an application through runtime validation of a stack of an executable binary code in a computer system, comprising the steps of:
   prior to initiating execution of the executable binary code:
      disassembling the executable binary code,
      listing all of application programming interfaces (API) or a function calls in the executable binary code,
      generating a validation table for a type of each API or a function call type, a location of each API or a function call type, and a return address in the executable binary code of each API or a function call type, and
      listing the type and locations of each API or a function call type in the executable binary code;
   for every function in the executable binary code:
      scanning a code for a stack setup,
   unwinding a set of instructions, and
      computing an effect of the set of instruction on the stack and an associated set of instruction pointers;
      creating a rule set for unwinding a stack frame for each function call in the executable binary code;
      inserting a monitoring and validation hook, wherein the monitoring and validation hook performs validation of the runtime stack during execution of executable binary code, after receiving a specified signal;
   in monitoring mode:
      executing an application binary code,
      sampling an associated application stack when triggered by the specified signal,
      sequentially unwinding a set of stack frames of the application stack until the stack frame returns an address pointing to a specific memory region is reached,
      determining an offset from a stack pointer to a location of the return address in a last stack frame, and
      generating an unwind table for recording an offset from the current stack pointer to the location of return address to the code in a specific memory region; and
   at runtime, with the monitoring and validation hook:
      waiting for the specified signal to perform a stack validation operation, wherein the specified signal comprises a system call;
      obtaining a stack value and an instruction pointer value;
      obtaining an unwind table to obtain the offset for the return address from a call to a function;
      unwinding the stack frame and obtaining a value of the return address from the function call;
      looking up an API call location in a lookup table to validate the return address as being consistent with a call to the stack frame; and implementing a default action when a rule violation is detected for a frame on the stack during the execution of the binary code.

11. The method of claim 10, wherein the validation of the stack of the application is performed in a kernel in the computer system.

12. The method of claim 10, wherein the validation of an observed stack of the application is performed in the hypervisor.

13. The method of claim 10, wherein the validation of the observed stack of the application is performed in a firmware of the computer system.

14. The method of claim 10, wherein the specified signal to perform stack validation is a system call made by the application.

* * * * *